US005973071A

United States Patent [19]

Modic

[11] Patent Number: 5,973,071

[45] Date of Patent: Oct. 26, 1999

[54] POLYMERIC COMPOSITION

[75] Inventor: Michael John Modic, Houston, Tex.

[73] Assignee: Shell Oil Company, Houston, Tex.

[21] Appl. No.: 09/040,987

[22] Filed: Mar. 18, 1998

Related U.S. Application Data

[60] Provisional application No. 60/041,089, Mar. 19, 1997.

[51] Int. Cl.[6] .............................................. C08L 53/02

[52] U.S. Cl. .......................... 525/96; 525/92 D; 525/240; 525/241; 526/160; 526/245; 526/902

[58] Field of Search .................................. 525/96, 92 D, 525/240, 241; 526/160, 245, 902

[56] References Cited

U.S. PATENT DOCUMENTS

| | | | |
|---|---|---|---|
| Re. 27,145 | 6/1971 | Jones | 260/880 |
| 3,299,174 | 1/1967 | Kuhre et al. | 260/876 |
| 4,904,731 | 2/1990 | Holden et al. | 525/98 |
| 5,194,530 | 3/1993 | Stevens et al. | 526/82 |
| 5,847,051 | 12/1998 | Hwo et al. | 525/98 |

FOREIGN PATENT DOCUMENTS

| | | | |
|---|---|---|---|
| 0 593 221 A2 | 4/1996 | European Pat. Off. | C08L 23/10 |
| 0 712 892 A1 | 5/1996 | European Pat. Off. | C08L 23/16 |
| 94/18263 | 8/1994 | WIPO | C08J 5/18 |

OTHER PUBLICATIONS

W.W. Yau, J.J. Kirkland, and D.D. Bly, *Modern Size–Exclusion Liquid Chromatography*, John Wiley & Sons, New York, NY 1979.

M.B. Huglin, *Light Scattering From Polymer Solution*, ET., Academic Press, New York, NY 1972.

W. Kaye and A.J. Kavlik, *Applied Optics*, 12, 541, (1973).

M.L. McConnell, *American Laboratory*, 63, May 1978.

*Primary Examiner*—James J. Seidleck
*Assistant Examiner*—Olga Asinovsky

[57] ABSTRACT

A polymeric composition is provided comprising a random copolymer polypropylene, a hydrogenated block copolymer comprising at least two polymeric block containing predominately monoalkenyl aromatic hydrocarbon monomer units and at least one block containing a predominately hydrogenated, conjugated diene unit, and an elastic metallocene-based polyolefin. The polymer has improved impact strength and clarity, particularly at low temperatures.

20 Claims, No Drawings

POLYMERIC COMPOSITION

This application claims the benefit of U.S. Provisional Application No. 60/041,089, filed Mar. 19, 1997, the entire disclosure of which is hereby incorporated by reference.

FIELD OF THE INVENTION

This invention relates to a polymeric composition. More particularly, this invention relates to a polymeric composition comprising an olefin polymer.

BACKGROUND OF THE INVENTION

Random Copolymer Polypropylene (RCPP) is a polypropylene copolymer containing a small (2–6% w) amount of ethylene. RCPP is used for applications that require improved clarity over homopolymer polypropylene. For example, the properties of RCPPs make them attractive for use in the manufacture of food containers for refrigerator and freezer use. However, RCPP, like homopolymer polypropylene, has a low impact strength, which leads to whitening under minor impact events, a phenomenon commonly known as blushing or hazing. The tendency towards blushing makes RCPPs unattractive for certain uses, such as food containers.

In U.S. Pat. No. 4,904,731, which disclosure is incorporated herein by reference, it was found that a hydrogenated block copolymer comprising at least two polymeric blocks containing predominately monoalkenyl aromatic hydrocarbon monomer units and at least one block containing a predominately hydrogenated, conjugated diene unit, or a blend of the hydrogenated block copolymer and linear low density polyethylene (LLDPE) can be combined with the RCPP to improve impact resistance and clarity. However, impact related hazing problems are still seen in this polymer when it is are used at low temperature. Therefore, even greater impact resistance and clarity, particularly at low temperatures, would be very desirable.

SUMMARY OF THE INVENTION

It has now been discovered that blending a hydrogenated block copolymer comprising at least two polymeric block containing predominately monoalkenyl aromatic hydrocarbon monomer units and at least one block containing a predominately hydrogenated, conjugated diene unit, and an elastic metallocene-based polyolefin with RCPP provides improved impact strength and clarity. It is therefore an object of this invention to provide a modified olefin polymer with improved impact strength, particularly low temperature impact strength. It is another object of this invention to provide a modified olefin polymer with excellent clarity, particularly after minor impact.

In accordance with the present invention, there is provided a polymeric composition comprising a random copolymer of propylene and ethylene which is modified with the addition of a hydrogenated elastomeric block copolymer having at least two resinous endblocks of polymerized monovinyl aromatic compound and an elastomeric midblock of polymerized conjugated diene and an elastic metallocene-based polyolefin.

DETAILED DESCRIPTION OF THE INVENTION

The present invention is drawn to a modified RCPP. Modification is accomplished with the addition of a hydrogenated elastomeric block copolymer having at least two resinous endblocks of polymerized monovinyl aromatic compound and an elastomeric midblock of polymerized conjugated diene and a metallocene ethylene-butylene copolymer, both of which are blended with the RCPP to increase impact resistance and reduce blushing, or hazing, caused by minor impact events.

In general, any olefin polymer known to be useful in the preparation of shaped articles can be used in the composition of this invention. Suitable olefin polymers include homopolymers of alpha olefins having from 2 to about 10 carbon atoms per molecule, copolymers of such alpha olefins and copolymers of such alpha olefins and one or more other monomers copolymerizable therewith. Other monomers copolymerizable with such alpha olefins include, but are not necessarily limited to, vinyl esters such as vinyl acetate, acrylic and methacrylic acid esters such as methylacrylate and methylmethacrylate, ethylenically unsaturated carboxylic acids such as acrylic and methylacrylic acids, and the like. As is well known in the art, olefin polymers, particularly polymers of olefins containing 3 or more carbon atoms per molecule may exhibit atactic, syndiotactic and/or isotactic structures. In general, polymers containing any combination of these structures are useful in the polymeric composition of the present invention. The invention is, however, most effective when the olefin polymer exhibits a crystallinity of at least 35%. Olefin copolymers exhibiting this degree of crystallinity are well known in the art. Such copolymers will exhibit significantly improved properties when used in the polymeric composition of this invention. The results realized with the modifier useful in the composition of this invention are even further improved when the olefin polymer comprises at least about 40% crystalline structure and such olefin polymers are, therefore, most preferred for use in the polymeric composition of this invention. Polymers of this type may be prepared with the methods summarized in U.S. Pat. No. 3,299,174, the disclosure of which patent is herein incorporated by reference. In particular, a random copolymer polypropylene having an ethylene content of about 4% and a crystallinity of about 40% has been found to work well. An example of such a RCPP is UCC Polypropylene NRD6-492 (Union Carbide), a RCPP with a melt flow of 12 g/10 min.

Any of the selectively hydrogenated block copolymers comprising at least two resinous endblocks of polymerized monovinyl aromatic compound, which gives a resinous segment, and an elastomeric midblock of polymerized conjugated diene, which gives an elastomeric segment, may be used in the polymer composition of this invention. Such elastomeric block copolymers are known in the art, as disclosed for instance in Stevens et al. U.S. Pat. No. 5,194,530 (Mar. 16, 1993), the disclosure of which is hereby incorporated by reference. The copolymers may be linear, A-B-A, or radial. It is also possible to use a mixture of block copolymers, such as a combination of a high molecular weight copolymer and a medium molecular weight copolymer.

Suitable monovinyl aromatic compounds are those having 8 to 20 carbon atoms as exemplified by styrene and styrene homologs such as alpha-methylstyrene and paramethylstyrene. Styrene is especially preferred. Suitable conjugated dienes include those having 4 to 8 carbon atoms. Illustrative of such conjugated dienes are 1,3-butadiene (butadiene), 2-methyl-1,3-butadiene (isoprene), 1-3-pentadiene (piperylene), 1,3-octadiene, and 2-methyl-1,3-pentadiene. Preferred conjugated dienes are butadiene and isoprene, most preferably butadiene.

The molecular weight of the copolymer will generally be at least 50,000. For linear A-B-A polymers, the molecular weight will generally be within the range of 50,000 to 200,000. Actually, the upper limit is dictated by viscosity considerations and can be as high as can be tolerated and still be processable. The most preferred molecular weight for linear A-B-A copolymers is 50,000 to 150,000. With radial polymers, the molecular weight can be much higher since these polymers have a lower viscosity for a given total molecular weight. Thus, for radial polymers the molecular weight generally will be in the range of 50,000 to 1 million, preferably 100,000 to 500,000.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak"molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics*, 12, 541 (1973).
4. M. L. McConnell, *American Laboratory*, 63, May, 1978.

The elastomeric block copolymers utilized in this invention are hydrogenated to such a degree that the unsaturation of the elastomeric block is greatly reduced without significant change in unsaturation of the resinous block component. Generally, at least 90 percent of the unsaturation in the diene midblock is hydrogenated and no more than 25 percent, preferably less than 10 percent, of the aromatic unsaturation is hydrogenated. Such hydrogenation techniques are known in the art and disclosed, for instance, in Jones Reissue 27,145 (Jun. 22, 1971), the disclosure of which is hereby incorporated by reference. Since the block copolymers utilized in this invention are hydrogenated to remove the aliphatic unsaturation, they can be viewed as S-EB-S polymers, where the S refers to the monovinyl aromatic, generally styrene, endblocks and the EB represents ethylene/butylene, which is the structure resulting from the hydrogenation of polymerized 1,3-butadiene.

Any random ethylene-butylene copolymer made using a metallocene catalyst would be useful as a component of the polymer composition. The use of metallocene based ethylene copolymers allow a final product with an olefin content of greater than 20% w. Further, their use results in a softer polymer than previously known compositions. Use of a metallocene ethylene-butylene copolymers having a density less than about 0.92 g/cc results in a polymer having good clarity and toughness. The most preferred metallocene ethylene-butylene copolymer has a density less than 0.89 g/cc, resulting in a polymer with excellent low temperature toughness, resistance to blushing, and clarity. EXACT® 3025, having a density of 0.91 g/cc, and EXACT® 4033, having a density of 0.88 g/cc (both from Exxon) are examples of metallocene based ethylene copolymers with the desired density.

In general, the hydrogenated block copolymer is added to the polymeric composition at a concentration of 75% w and the metallocene is added at a concentration of 75% w. Moreover, the weight ratio of block copolymer to elastic metallocene-based polyolefin should be in the range from about 25:75 to about 75:25. Most preferably, the weight ratio of hydrogenated copolymer to metallocene is 50:50.

Any of the techniques known in the art for blending polymeric components may be used to combine the components of the polymeric composition of this invention. Suitable blending techniques include solution blending, solid state physical admixture, molten state admixture, extrusion admixture, roll milling, screw extrusion, and the like. Of these, solution blending will, generally, produce the most uniform blend, however, mixing in the molten state with equipment such as a Banbury mixers, extruders or roll mills will be more convenient. In general, molten phase admixture will be accomplished at temperatures within the range from about 140° C. to about 270° C. but higher and lower temperatures may, in some cases at least, be operable.

The polymer compositions of this invention may be used in any of the applications for which olefin polymers are known to be useful. Such uses include the production of molded objects, mechanical goods and extruded materials. The polymeric compositions of this invention may be used in injection molding operations, blow molding operations, compression molding operations and the like. The polymeric compositions of this invention may also be extruded or co-extruded to produce films, sheets, textile coatings, pipes, wire coatings, fibers and the like. Due to the excellent impact strength and blushing resistance seen by the materials of the invention, the polymer compositions can be used at lower temperatures than previously known olefin polymers. A particular use is clear, or near clear, food containers for food preparation and storage at low temperature.

Depending upon the particular application or end use in which the compositions of this invention are to be used, the same may be compounded with other components known in the art including synthetic and natural reinforcing fillers such as carbon black, asbestos, fibers and the like; pigments such at titanium dioxide, iron blue, cadmium pigments, chrome yellow, molybdate orange, ultramarine blue, molybdate red, zinc chromate, ultramarine green, various acid dyes, basic dyes, anthraquinones, Red Lake C, Red 23, benzidine yellow, benzidine orange, carbon blacks and the like; various plasticizers; antiblocking agents; antioxidants; lubricants; flame retardants and the like. In general, these materials, when used, will be used at effective concentrations well known in the prior art. Moreover, these materials may be added to the polymeric composition using techniques well known in the prior art.

EXAMPLES OF THE PREFERRED EMBODIMENTS OF THE INVENTION

Three types of modifiers were prepared for admixing with a RCPP:

1. A hydrogenated block copolymer comprising 2 blocks of polystyrene and a single block of hydrogenated polybutadiene (S-EB-S) having a molecular weight of about 75,000 and a LLDPE having a density of about 0.918 g/cc were blended together on a 25 mm co-rotating twin screw extruder at 225° C. and a screw speed of 300 rpm. The ingredients were dry tumbled together prior to addition to the twin screw extruder.
2. The S-EB-S block copolymer described in (1) and a metallocene ethylene-butylene copolymer were blended together on the 25 mm co-rotating twin screw extruder at 225° C. and a screw speed of 300 rpm. The ingredients were dry tumbled together prior to addition to the twin screw extruder.
3. A metallocene ethylene-butylene copolymer was used unblended as the modifier.

The modifier blend extrudates were collected as pellets and then dry tumbled with a RCPP having 4% w ethylene and about 40% crystallinity, then again blended together on the 25 mm co-rotating twin screw extruder at 240° C. and a screw speed of 300 rpm. The resulting blends were molded into test specimens on a 25 ton injection molding machine.

The specimens were tested for flexural modulus per ASTM D790, room temperature notch toughness per ASTM D256, Gardner impact at −20° C. per ASTM D3029, and transmittance per ASTM D523. Results are shown in the Table.

TABLE

| Sample | Modifier | Modifier Concn (% w) | RT Notch Toughness (ft-lbs) | Flexural Modulus | Gardner Impact (−20° C.) (ft-lbs) | Transmittance (%) |
|---|---|---|---|---|---|---|
| MG-762 | S-EB-S/LLDPE | 15 | 1.7/1.7 | 123 | 47.3 | 64.8 |
| MG-763 | M1 + S-EB-S | 15 | 1.4/1.5 | 132 | 17.5 | 69.8 |
| MG-764 | M3 + S-EB-S | 15 | 2.3/2.3 | 119 | 60,6 | 66.6 |
| MG-765 | M3 | 15 | 2.9/2.2 | 121 | 85.9 | 62.6 |

M1 = a metallocene ethylene-butylene copolymer having a density of 0.91
M3 = a metallocene ethylene-butylene copolymer having a density of 0.88

It can be seen that the use of the block copolymer and a metallocene ethylene-butylene copolymer having a density of less than 0.89 g/cc results in a polymer with the greatest combination of toughness and clarity (Sample MG-764). The use of a modifier which is a blend of block copolymer and metallocene ethylene-butylene copolymer (Samples MG-763 and MG-764) provides superior results to a modifier which is a blend of block copolymer and LLDPE (Sample MG-762). The use of metallocene ethylene-butylene copolymer alone provides good impact resistance but does not improve clarity.

While the present invention has been described and illustrated by reference to particular embodiments thereof, it will be appreciated by those of ordinary skill in the art that the same may lend itself to variations not necessarily described or illustrated herein. For this reason then, reference should be made solely to the appended claims for purposes of determining the true scope of the invention.

What is claimed is:

1. A polymeric composition comprising:

a random copolymer of propylene and 2 to 6% w ethylene;

a hydrogenated elastomeric block copolymer having at least two resinous endblocks of polymerized monovinyl aromatic compound and an elastomeric midblock of polymerized conjugated diene; and an elastic metallocene-based polyolefin.

2. A composition according to claim 1 wherein said resinous endblocks comprise polymerized styrene.

3. A composition according to claim 2 wherein said elastomeric midblock is selected from polymerized 1,3-butadiene and polymerized isoprene.

4. A composition according to claim 3 wherein said elastic metallocene-based polyolefin has a density less than about 0.92 g/cc.

5. A composition according to claim 4 wherein said random copolymer of propylene and ethylene is present in a concentration of about 85 parts by weight and said elastomeric block copolymer is present in a concentration of about 15 parts by weight.

6. A composition according to claim 5 wherein the weight ratio of block copolymer to elastic metallocene-based polyolefin is in the range from about 25:75 to about 75:25.

7. A composition according to claim 6 wherein said elastomeric midblock is polymerized 1,3-butadiene.

8. A composition according to claim 7 wherein elastic metallocene-based polyolefin has a density of less than about 0.89 g/cc.

9. A composition according to claim 8 wherein said block copolymer has a molecular weight in the range of about 50,000 to about 200,000.

10. A composition according to claim 9 wherein said random copolymer of propylene and ethylene has a crystallinity of at least 35%.

11. A composition according to claim 10 wherein said random copolymer of propylene and ethylene has a concentration of ethylene of 4% w and a crystallinity of 40%.

12. A polymeric composition comprising:

75 to 95 weight percent of a random copolymer of propylene and 2 to 6% w ethylene;

19 to 1 weight percent of a hydrogenated elastomeric linear block copolymer having at least two resinous endblocks of polymerized monovinyl aromatic compound and an elastomeric midblock of polymerized conjugated diene, said block copolymer having a molecular weight of at least 50,000; and 19 to 1 weight percent of an elastic metallocene-based polyolefin.

13. A composition according to claim 12 wherein the weight ratio of block copolymer to elastic metallocene-based polyolefin is in the range from about 25:75 to about 75:25.

14. A composition according to claim 13 wherein said elastic metallocene-based polyolefin has a density of less than about 0.92 g/cc.

15. A composition according to claim 14 wherein said elastic metallocene-based polyolefin has a density of less than about 0.89 g/cc.

16. A composition according to claim 12 wherein said random copolymer of propylene and ethylene has a crystallinity of at least 35%.

17. A composition according to claim 16 wherein said random copolymer of propylene and ethylene has a concentration of ethylene of 4% w and a crystallinity of 40%.

18. A composition according to claim 12 wherein said elastomeric midblock is selected from polymerized 1,3-butadiene and polymerized isoprene.

19. A composition according to claim 18 wherein said elastomeric midblock is polymerized 1,3-butadiene.

20. A composition according to claim 13 wherein the weight ratio of block copolymer to elastic metallocene-based polyolefin is in the range of about 50:50.

* * * * *